US011055681B2

(12) United States Patent
Gruen et al.

(10) Patent No.: US 11,055,681 B2
(45) Date of Patent: Jul. 6, 2021

(54) THIRD PARTY RELATIONSHIP MANAGEMENT FOR ATTRACTION ACCESS

(71) Applicant: ZM Ventures LLC, New York, NY (US)

(72) Inventors: Allan Gruen, Brooklyn, NY (US); Boris Yudasin, Spring Valley, NY (US)

(73) Assignee: ZM Ventures LLC, New York, NY (US)

( * ) Notice: Subject to any disclaimer, the term of this patent is extended or adjusted under 35 U.S.C. 154(b) by 0 days.

(21) Appl. No.: 16/454,931

(22) Filed: Jun. 27, 2019

(65) Prior Publication Data

US 2020/0005266 A1 Jan. 2, 2020

Related U.S. Application Data

(60) Provisional application No. 62/691,384, filed on Jun. 28, 2018.

(51) Int. Cl.
*G06Q 20/14* (2012.01)
*G06Q 20/04* (2012.01)
(Continued)

(52) U.S. Cl.
CPC ......... *G06Q 20/145* (2013.01); *G06Q 20/045* (2013.01); *G06Q 20/0855* (2013.01);
(Continued)

(58) Field of Classification Search
CPC ........ G06Q 10/00; G06Q 20/00; G06Q 30/00; G06Q 40/00; G06Q 20/145; G06Q 20/045;
(Continued)

(56) References Cited

U.S. PATENT DOCUMENTS 6,173,209 B1   1/2001  Laval et al.
6,505,774 B1*  1/2003  Fulcher .............. G06Q 30/0284
                                                   235/379
(Continued)

FOREIGN PATENT DOCUMENTS

WO    2012174261 A2    12/2012

OTHER PUBLICATIONS

Whalimg, James et al., "Drop Dead Scary", The Daily Mirror, Proquest Document Id 1908415104, Jun. 10, 2017.*
(Continued)

*Primary Examiner* — Frantzy Poinvil
(74) *Attorney, Agent, or Firm* — Kim IP Law Group LLC

(57) ABSTRACT

Apparatuses, methods, and computer-readable media are provided for determining site-related reimbursement amounts for vendors. The apparatus includes a processor in communication with an attraction verification terminal for an attraction site. The processor is configured to receive, from the attraction verification terminal, an access request for a customer having an access identifier. The processor is configured to determine and validate access privilege data for the customer and referral data for a plurality of vendors based on the access request and access identifier. The processor is configured to transmit, to the attraction verification terminal, a virtual access token permitting the customer to access the attraction site upon a determination that the access privilege data is valid. The processor is configured to determine a reimbursement amount for the plurality of vendors based on the referral data and the access identifier.

20 Claims, 6 Drawing Sheets

(51) Int. Cl.
*G06Q 20/40* (2012.01)
*G06Q 20/08* (2012.01)
*G07C 9/27* (2020.01)
*G06Q 30/02* (2012.01)
*G06K 19/06* (2006.01)

(52) U.S. Cl.
CPC ....... *G06Q 20/405* (2013.01); *G06Q 30/0221* (2013.01); *G07C 9/27* (2020.01); *G06K 19/06037* (2013.01)

(58) Field of Classification Search
CPC ............. G06Q 20/0855; G06Q 20/405; G06Q 30/0221; G07C 9/27; G06K 19/06307
USPC ........................................................ 705/3–44
See application file for complete search history.

(56) References Cited

U.S. PATENT DOCUMENTS

| | | | | |
|---|---|---|---|---|
| 6,715,673 | B2* | 4/2004 | Fulcher | G06Q 30/0284 235/379 |
| 7,400,932 | B2 | 7/2008 | Ackley et al. | |
| 7,546,254 | B2* | 6/2009 | Bednarek | G06Q 30/0201 705/26.1 |
| 7,765,128 | B2 | 7/2010 | Brooks et al. | |
| 8,083,133 | B2 | 12/2011 | Seifert et al. | |
| 8,688,504 | B2* | 4/2014 | Reisman | G06Q 30/0201 705/7.29 |
| 8,775,303 | B2 | 7/2014 | Higgins et al. | |
| 9,064,353 | B2* | 6/2015 | McLaughlin | G06Q 20/3276 |
| 9,361,620 | B2 | 6/2016 | Evans et al. | |
| 9,378,470 | B2* | 6/2016 | McLaughlin | G06Q 20/3276 |
| 9,619,818 | B2 | 4/2017 | Horowitz et al. | |
| 9,639,670 | B2 | 5/2017 | Kacharia et al. | |
| 9,858,537 | B2* | 1/2018 | McLaughlin | G06Q 30/00 |
| 2002/0116235 | A1 | 8/2002 | Grimm et al. | |
| 2004/0267619 | A1 | 12/2004 | Watts | |
| 2009/0222358 | A1* | 9/2009 | Bednarek | G06Q 30/0207 705/26.1 |
| 2010/0274638 | A1 | 10/2010 | Taicher | |
| 2011/0015976 | A1 | 1/2011 | Empel et al. | |
| 2011/0270665 | A1 | 11/2011 | Kim et al. | |
| 2011/0281630 | A1 | 11/2011 | Omar | |
| 2011/0313831 | A1 | 12/2011 | Ku | |
| 2012/0322428 | A1 | 12/2012 | Lupoli et al. | |
| 2012/0323691 | A1* | 12/2012 | McLaughlin | G07C 9/20 705/14.58 |
| 2013/0144733 | A1 | 6/2013 | Rothschild | |
| 2013/0282536 | A1 | 10/2013 | Mohazzabfar et al. | |
| 2014/0358599 | A1* | 12/2014 | McLaughlin | G07C 9/20 705/5 |
| 2015/0379544 | A1 | 12/2015 | Matejka | |
| 2016/0092797 | A1 | 3/2016 | Clarke et al. | |
| 2016/0125492 | A1 | 5/2016 | Walker et al. | |
| 2017/0364936 | A1 | 12/2017 | Balfour et al. | |
| 2018/0197118 | A1* | 7/2018 | McLaughlin | G06Q 10/02 |

OTHER PUBLICATIONS

International Search Report in International Patent Application No. PCT/US2019/039527 dated Oct. 16, 2019.
Written Opinion in International Patent Application No. PCT/US2019/039527 dated Oct. 16, 2019.
Livingsocial—Local Deals, 2018, LivingSocial, Inc., Mobile Application Software, https://play.google.com/store/apps/details?id=com.livingsocial.
Groupon—Shop Deals, Discounts, & Coupons, 2018, Groupon, Inc., Mobile Application Software, https://play.google.com/store/apps/details?id=com.groupon.
Slickdeals; Coupons & Shopping, 2018, Slickdeals, Mobile Application Software, https://play.google.com/store/apps/details?id=net.slickdeals.android.
Ticketmaster Event Tickets, 2018, Ticketmaster LLC, Mobile Application Software, https://play.google.com/store/apps/details?id=com.ticketmaster.mobile.android.na.
Klook: Sightseeing Tours, Activities & Experiences, 2018, Klook Travel Technology Ltd., Mobile Application Software, https://play.google.com/store/apps/details?id=com.klook.
StubHub—Tickets to Sports, Concerts & Events, 2018, StubHub, Mobile Application Software, https://play.google.com/store/apps/details?id=com.stubhub.
Coupons and Deals—Save Money, 2018, Coupons Club Inc., Mobile Application Software, https://play.google.com/store/apps/details?id=coupons.deals.voucher.freebies.

* cited by examiner

THIRD PARTY RELATIONSHIP MANAGEMENT FOR ATTRACTION ACCESS

CROSS-REFERENCE TO RELATED APPLICATIONS

This application claims the benefit of U.S. Provisional Patent Application No. 62/691,384 filed Jun. 28, 2018 and entitled "ATTRACTION ACCESS SYSTEM WITH CONTRACT ENGINE AND VOUCHER ENGINE," the entire disclosure of which is hereby incorporated by reference herein for all purposes.

FIELD OF THE INVENTION

The subject application generally relates to systems and methods for providing access to facilities, places, and events that require authorization or a fee for entrance, purchase, or use (such as tourist attractions). In particular, the subject application relates to systems and methods for providing such attraction access using customer-held passes that incorporate a variety of contract validation and voucher validation schemes.

BACKGROUND OF THE INVENTION

Customers are accustomed to purchasing vouchers or passes, such as conventional paper tickets or electronic wristbands, to allow access to attraction sites. The customer typically purchases an electronic wristband and the attraction site includes a scanner that scans the electronic wristband. The wristband and scanner allow access to one or more attraction sites, either immediately when the customer first visits the attraction site, or later.

Customers may purchase such vouchers or passes from the attraction owner or from a third party. Third parties who sell, resell, or distribute vouchers or passes for access to attraction sites may receive a commission or referral payment for selling vouchers to the customer. The ability to sell, resell, or distribute vouchers or passes may be described in one or more contractual agreements between the third party and various other parties. Similarly, the process and details for receiving the commission or referral payment may be disclosed in such contractual agreements.

BRIEF SUMMARY OF THE INVENTION

In accordance with an exemplary embodiment, the subject disclosure provides an apparatus for determining site-related reimbursement amounts for vendors. The apparatus includes a processor in communication with an attraction verification terminal. The attraction verification terminal is for an attraction site. The processor is configured to receive, from the attraction verification terminal, an access request for a customer having an access identifier. The processor is also configured to determine and validate access privilege data for the customer and referral data for a plurality of vendors based on the access request and access identifier. The processor is additionally configured to transmit, to the attraction verification terminal, a virtual access token permitting the customer to access the attraction site upon a determination that the access privilege data is valid. The processor is also configured to determine a reimbursement amount for the plurality of vendors based on the referral data and the access identifier.

In accordance with further aspects of the exemplary embodiment, the access identifier is a universal access identifier associated with the customer, the referral data for the plurality of vendors is associated with the universal access identifier, and the processor configured to determine the reimbursement amount includes the processor being configured to determine commission for a vendor among the plurality of vendors upon access by the customer to a subsequent attraction site based on the universal access identifier. The processor configured to determine the reimbursement amount includes the processor being configured to determine commission for the vendor upon a determination that the vendor sold the customer access to the attraction site without selling access to the subsequent attraction site. The referral data for the plurality of vendors includes a series of virtual contracts reflecting a contractual relationship between the vendors and the processor configured to determine and validate the referral data includes the processor being configured to validate the contractual relationship between the vendors. The processor configured to determine the reimbursement amount includes the processor being configured to determine commission for a vendor among the plurality of vendors based on the series of virtual contracts. The processor configured to determine the reimbursement amount includes the processor being configured to determine a contracted reimbursement rate for a vendor among the plurality of vendors based on the series of virtual contracts. The access identifier includes a universal access identifier, a virtual attraction pass, a credit card, a debit card, a quick response (QR) code, a two-dimensional barcode, or a one-dimensional barcode. The vendor is a distributor or a reseller. The attraction site includes a sightseeing experience, a bus tour, a boat tour, a helicopter tour, a walking tour, a bicycle tour, a building tour, a theatre show, a play, a musical, a museum, an observatory, a restaurant, a food or drink experience, a shopping experience, an escape room, a library, or a historical building. The processor configured to receive the access request for the customer includes the processor being configured to receive, from the attraction verification terminal, scan results to validate the access identifier for the customer.

In accordance with another exemplary embodiment, the subject disclosure provides a method for determining site-related reimbursement amounts for vendors. The method includes receiving, from an attraction verification terminal for an attraction site, an access request for a customer having an access identifier. The method also includes determining and validating access privilege data for the customer and referral data for a plurality of vendors based on the access request and access identifier. The method additionally includes transmitting, to the attraction verification terminal, a virtual access token permitting the customer to access the attraction site upon a determination that the access privilege data is valid. The method also includes determining a reimbursement amount for the plurality of vendors based on the referral data and the access identifier.

In accordance with further aspects of the exemplary embodiment, the access identifier is a universal access identifier associated with the customer, the referral data for the plurality of vendors is associated with the universal access identifier, and determining the reimbursement amount includes determining commission for a vendor among the plurality of vendors upon access by the customer to a subsequent attraction site based on the universal access identifier. Determining the reimbursement amount includes determining commission for the vendor upon a determination that the vendor sold the customer access to the attraction site without selling access to the subsequent attraction site. The referral data for the plurality of vendors includes a series of virtual contracts reflecting a contractual relationship between the vendors and determining and validating the referral data includes validating the contractual relationship between the vendors. Determining the reimbursement amount includes determining commission for a vendor among the plurality of vendors based on the series of virtual contracts. Determining the reimbursement amount includes determining a contracted reimbursement rate for a vendor among the plurality of vendors based on the series of virtual contracts. The access identifier includes a universal access identifier, a virtual attraction pass, a credit card, a debit card, a quick response (QR) code, a two-dimensional barcode, or a one-dimensional barcode. The vendor is a distributor or a reseller. The attraction site includes a sightseeing experience, a bus tour, a boat tour, a helicopter tour, a walking tour, a bicycle tour, a building tour, a theatre show, a play, a musical, a museum, an observatory, a restaurant, a food or drink experience, a shopping experience, an escape room, a library, or a historical building. Receiving the access request for the customer includes receiving, from the attraction verification terminal, scan results to validate the access identifier for the customer.

In accordance with another exemplary embodiment, the subject disclosure provides a non-transitory computer-readable medium for determining site-related reimbursement amounts for vendors, comprising instructions stored thereon. When executed on a processor, the instructions perform the steps of receiving, from an attraction verification terminal for an attraction site, an access request for a customer having an access identifier. The steps also include determining and validating access privilege data for the customer and referral data for a plurality of vendors based on the access request and access identifier. The steps additionally include transmitting, to the attraction verification terminal, a virtual access token permitting the customer to access the attraction site upon a determination that the access privilege data is valid. The steps also include determining a reimbursement amount for the plurality of vendors based on the referral data and the access identifier.

In accordance with further aspects of the exemplary embodiment, the access identifier is a universal access identifier associated with the customer, the referral data for the plurality of vendors is associated with the universal access identifier, and determining the reimbursement amount includes determining commission for a vendor among the plurality of vendors upon access by the customer to a subsequent attraction site based on the universal access identifier. Determining the reimbursement amount includes determining commission for the vendor upon a determination that the vendor sold the customer access to the attraction site without selling access to the subsequent attraction site. The referral data for the plurality of vendors includes a series of virtual contracts reflecting a contractual relationship between the vendors and determining and validating the referral data includes validating the contractual relationship between the vendors. Determining the reimbursement amount includes determining commission for a vendor among the plurality of vendors based on the series of virtual contracts. Determining the reimbursement amount includes determining a contracted reimbursement rate for a vendor among the plurality of vendors based on the series of virtual contracts. The access identifier includes a universal access identifier, a virtual attraction pass, a credit card, a debit card, a quick response (QR) code, a two-dimensional barcode, or a one-dimensional barcode. The vendor is a distributor or a reseller. The attraction site includes a sightseeing experience, a bus tour, a boat tour, a helicopter tour, a walking tour, a bicycle tour, a building tour, a theatre show, a play, a musical, a museum, an observatory, a restaurant, a food or drink experience, a shopping experience, an escape room, a library, or a historical building. Receiving the access request for the customer includes receiving, from the attraction verification terminal, scan results to validate the access identifier for the customer.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings.

DETAILED DESCRIPTION OF THE INVENTION

Figure 1:
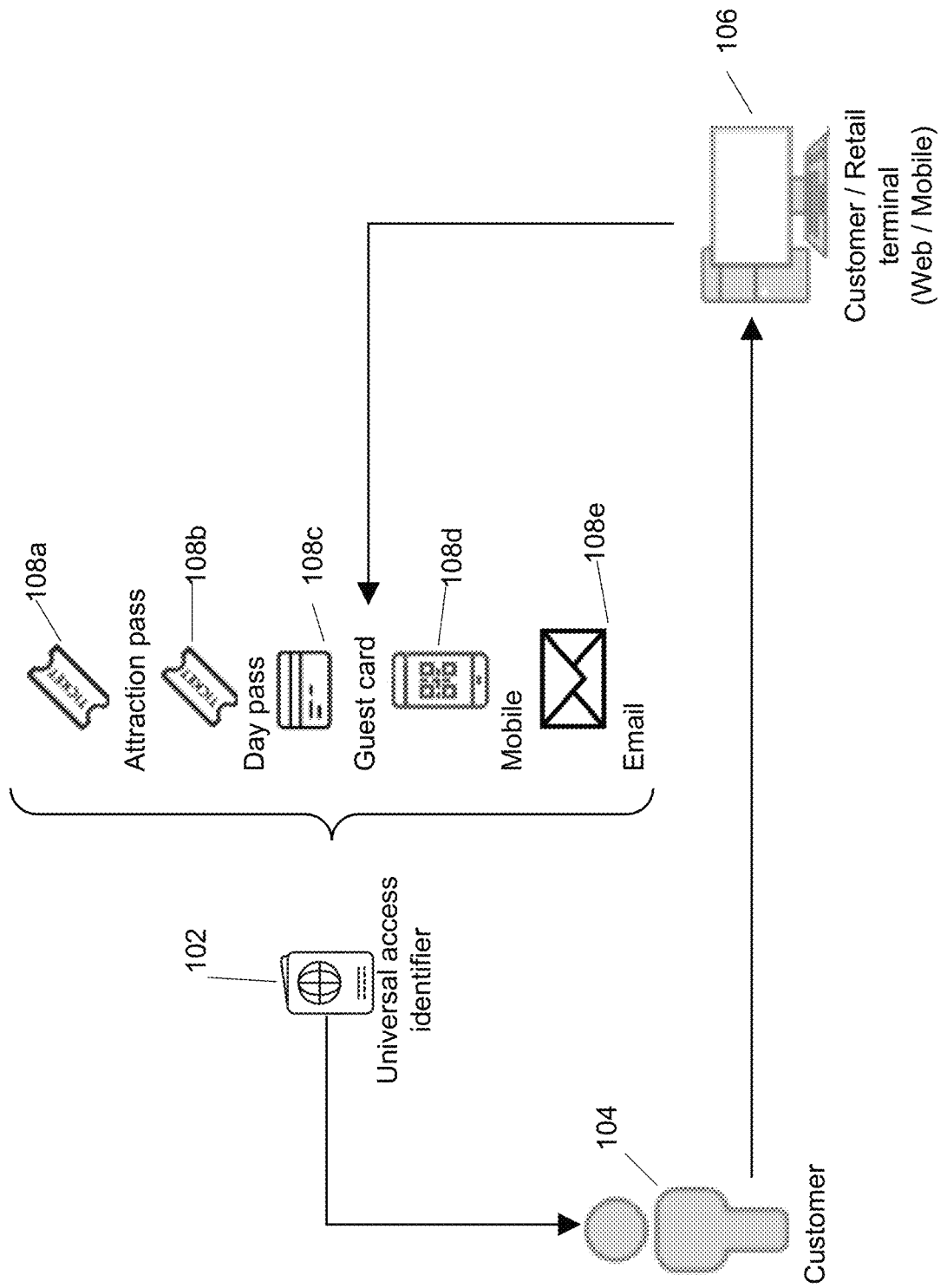
FIG. 1 depicts a block diagram of an exemplary customer order in accordance with an embodiment of the present invention.

As discussed in greater detail herein, the present disclosure describes systems and methods that allow for managing relationships among third parties who provide attraction access to customers. The subject attraction access system receives, from an attraction verification terminal for an attraction site, an access request for a customer who presents an access identifier. The system determines and validates access privilege data for the customer, and referral data for a plurality of third parties, based on the received access request and access identifier. Upon a determination that the access privilege data is valid, the system transmits, to the attraction verification terminal, a virtual access token permitting the customer to access the attraction site.

The system manages third-party relationships by determining a reimbursement amount for the plurality of third parties, based on the referral data and the access identifier. Example third parties may include a vendor, reseller, distributor, or attraction owner. The reimbursement amount may be a commission amount, which the system may determine for a plurality of vendors, resellers, or distributors based on the referral data and the access identifier. The reimbursement amount may also be a contracted rate, which the system may determine for one or more attraction owners based on the referral data and the access identifier.

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Furthermore, the subject application references certain methods or processes that are described and presented as a series of ordered steps. It should be understood that the steps described with respect to those processes are not to be understood as enumerated consecutive lists but could be performed in various orders while still embodying the invention described herein.

An object of the present attraction access system is to reduce the latency and increase the speed and accuracy of reimbursement transactions for third parties that provide attraction access.

The present attraction access system addresses this object by determining reimbursement amounts for third parties contemporaneously while determining and validating access to attraction sites for customers. The attraction access system identifies relationships among third parties based on processing structured contract data to identify reimbursement amounts for the third parties. The attraction access system parses structured or unstructured contracts to determine contract data. The attraction access system increases the speed and accuracy of reimbursement transactions by determining reimbursement amounts based on referrals or contracted rates. In this regard, the attraction access system improves the functioning of a computer and an attraction verification terminal with which the computer communicates.

Referring now to FIG. 1, a block diagram of an exemplary customer order is shown in accordance with an embodiment of the present attraction access system. A customer 104 initiates an order at a terminal 106 to allow the customer or related parties to tour, visit, or otherwise access an attraction site. The terminal may be a customer terminal or a retail terminal. The customer or retail terminal runs a web-based or mobile application that allows the customer to initiate an order. In the case of the customer terminal, the order application is accessible via a device under the control or ownership of the customer. In the case of the retail terminal, the order application is accessible via a device under the control or ownership of a third-party, such as a retailer, vendor, distributor, reseller, or attraction owner. Example devices include a desktop computer, laptop computer, mobile device, or tablet.

Non-limiting example attraction sites may include a sightseeing experience, a bus tour, a boat tour, a helicopter tour, a walking tour, a bicycle tour, a building tour, a theatre show, a play, a musical, a museum, an observatory, a restaurant, a food experience, a shopping experience, an escape room, a library, or a historical building.

The customer 104 places an order via a third-party and receives an access identifier 108a-108e from the third-party or from the attraction access system. In general, the access identifier is a voucher that allows access to one or more attraction sites over a given time period. For example, the access identifier may be an attraction pass 108a that allows access to a limited or capped number of attraction sites and subsequently expires. The attraction pass may allow access to 1, 2, 3, 4, 5, 6, 7, 8, 9, 10, or any other number of attraction sites. Optionally, the attraction access system may further associate an expiration time period with the attraction pass, such as a two-day attraction pass that expires after three days. The access identifier may be a day pass 108b with an associated expiration date that allows access to an unlimited number of attractions during the activity period, such as a four-day pass. The access identifier may be a guest card 108c with an associated currency balance that allows access to attraction sites until the balance is depleted. The customer may preload or pre-purchase currency for use at attraction sites. In some aspects, the attraction access system allows the customer to select an attraction site and associate the pre-purchased currency with the selected attraction site, such that the currency is only available for use in connection with the selected attraction site and no other attraction site. The customer may also elect to refill the available balance periodically. The guest card may be a credit card or debit card. Additionally, the access identifier may be a barcode such as a quick response (QR) code, two-dimensional barcode, or one-dimensional barcode. The customer may receive the access identifier on a mobile device 108d, for example via a mobile app or mobile web browser. The customer may also receive the access identifier in an email 108e.

The access identifier may be a universal access identifier 102. The universal access identifier is a unique identifier that is associated with a customer generally, rather than with a specific attraction. Accordingly, the universal access identifier may be configured to allow access to a limited or unlimited number of attraction sites for a limited or unlimited time period. The universal access identifier may be accessed in the form of a quick-response (QR) code presented on a mobile device or via email and scanned via a barcode scanner at an attraction verification terminal. The universal access identifier may also be accessed in the form of a guest card such as a credit card or debit card and scanned via a point-of-sale terminal. Advantageously, integration with a point-of-sale terminal would not require the attraction to maintain standalone barcode scanning hardware such as a barcode scanning terminal. The universal access identifier may be configured to associate a currency balance with the customer, for attraction access. The customer may elect to refill the currency balance periodically.

When the customer presents the access identifier at an attraction verification terminal, the attraction verification terminal scans the access identifier and constructs an access request, as described in further detail herein. The attraction access system receives the access request with the access identifier, and determines and validates access privilege data based on the received access request.

Figure 2:
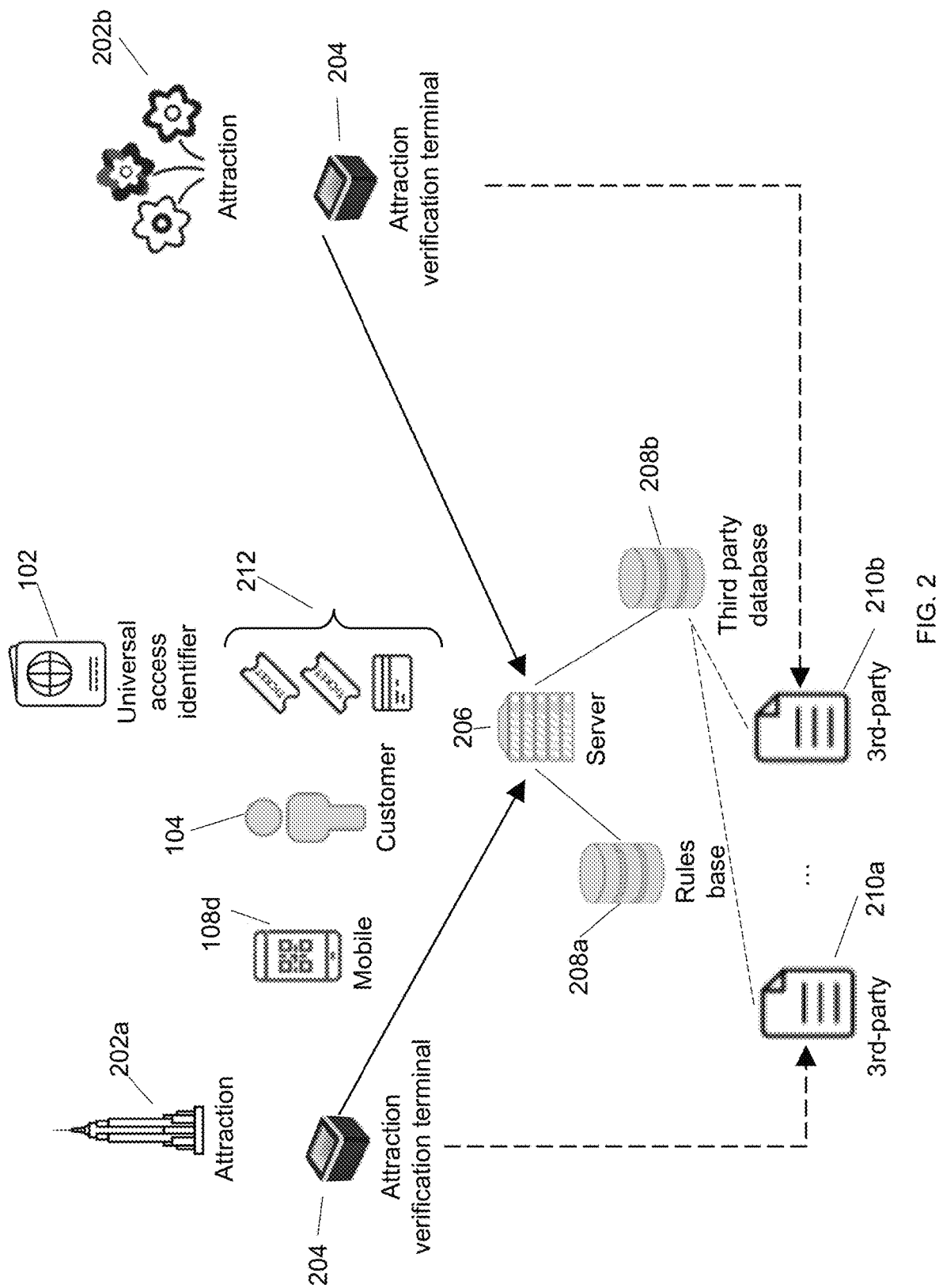
FIG. 2 depicts a block diagram of an exemplary customer access to a plurality of attractions in accordance with an embodiment of the present invention.

Referring now to FIG. 2, a block diagram of an exemplary customer access to a plurality of attractions is shown in accordance with an embodiment of the present attraction access system. The customer 104 presents an access identifier at a first attraction 202a. For example, the customer displays the access identifier on a mobile device 108d. The mobile device may display the access identifier from a mobile app, an email received from the third-party, or a web browser.

An attraction verification terminal 204 at the attraction site of the first attraction 202a or the second attraction 202b scans the access identifier. The attraction verification terminal may be special-purpose hardware such as a standalone terminal capable of scanning quick-response (QR) barcodes, matrix barcodes, or other multi-dimensional or one-dimensional barcodes. For example, an Alacrity 8200 series desktop barcode scanner or a Symcode Omnidirectional desktop barcode scanner, both provided by Shenzhen Alacrity Barcode Technology Co., Ltd. of Shenzhen, China may be used. Alternatively, the attraction verification terminal may be a mobile app that executes on general-purpose hardware such as a mobile device and uses a camera embedded in the mobile device to optically scan the access identifier. In other aspects, the attraction verification terminal may be a point-of-sale terminal of the type used to read guest cards such as credit cards or debit cards. The attraction verification terminal constructs an access request based on the access identifier and transmits the access request to the server 206.

The server 206 receives the access request and determines a corresponding rule from the rules base 208a. The server may determine the corresponding rule based on an attraction identifier, access identifier, or customer identifier retrieved from the access request. The server may use additional factors to determine the corresponding rule. For example, a date and time that the access request is sent from the attraction verification terminal 204 or received by the server may be used.

The server executes the corresponding rule to determine and validate access privilege data for the attraction site based on the access request. The access privilege data identifies whether the customer or related parties are allowed access to the attraction site. If the attraction access system determines that the access privilege data is valid, the system constructs a virtual access token for transmission to the attraction. The virtual access token allows access to the attraction site by controlling a physical device located at the attraction site, such as a turnstile, bar, or other ingress.

If the customer 104 subsequently visits a second attraction 202b, the attraction access system constructs access privilege data and a virtual access token to determine whether the customer or related parties are allowed access to the attraction site, as described above.

Additionally, the attraction access system determines a reimbursement amount for one or more third-parties, upon entry to the second attraction. If the customer 104 presents a universal access identifier 102 at the attraction verification terminal 204 of the second attraction 202b, then the attraction access system is operable to retrieve data corresponding to a series of one or more contracts associated with the second attraction. A third-party vendor such as a travel website has physical or virtual contractual agreements established for the first and second attraction, either directly with the attraction owner or indirectly with another third-party reseller. The travel website sells vouchers or passes to the customer allowing access to the first attraction 202a. The customer subsequently purchases a second voucher or pass to the second attraction 202b. Alternatively, the customer can recharge a currency balance associated with the universal access identifier for access to the second attraction. The customer may purchase the second voucher either from the third-party vendor or from the third-party reseller having the contractual agreement in place with the third-party vendor.

Upon receiving an access request from an attraction verification terminal, the attraction access system also determines and validates referral data based on the received access request. The referral data corresponds to a series of one or more contracts 210a-210b among vendors, resellers, distributors, or attraction owners who are associated with the attraction, as described above. The attraction access system determines and validates referral data by generating a hierarchy of relationships among the third-parties. The attraction access system generates the hierarchy of relationships based on the access identifier, customer data, order data, a third-party identifier, or any combination of the foregoing data. The attraction access system may determine the order data and third-party identifier by parsing structured or unstructured data relating to the one or more contracts. The third-party identifier is associated with the vendor, distributor, reseller, or attraction owner that sold the voucher or pass to the customer. The third-party database 208b stores third-party data corresponding to the contractual parties for the attraction access system to store and retrieve.

The order data may include an individual reimbursement amount between the parties, and the attraction access system may determine an overall reimbursement amount for the third-parties based on the order data. The order data may also include the price that the customer paid for the attraction tour, the purchase date, the tour date, the attraction, a listing of participants in the customer's party for the attraction tour, and ages of the participants.

The universal access identifier 102 may be generated by the third-party, for example when the travel website sells the initial vouchers or passes to the customer. Because the universal access identifier is associated with the customer generally, rather than with a specific attraction, the attraction access system is able to track the customer's access to multiple attractions 202a-202b. The universal access identifier may also be associated with vendor data in the vendor database indicating that the universal access identifier originated from the third-party.

Figure 3:
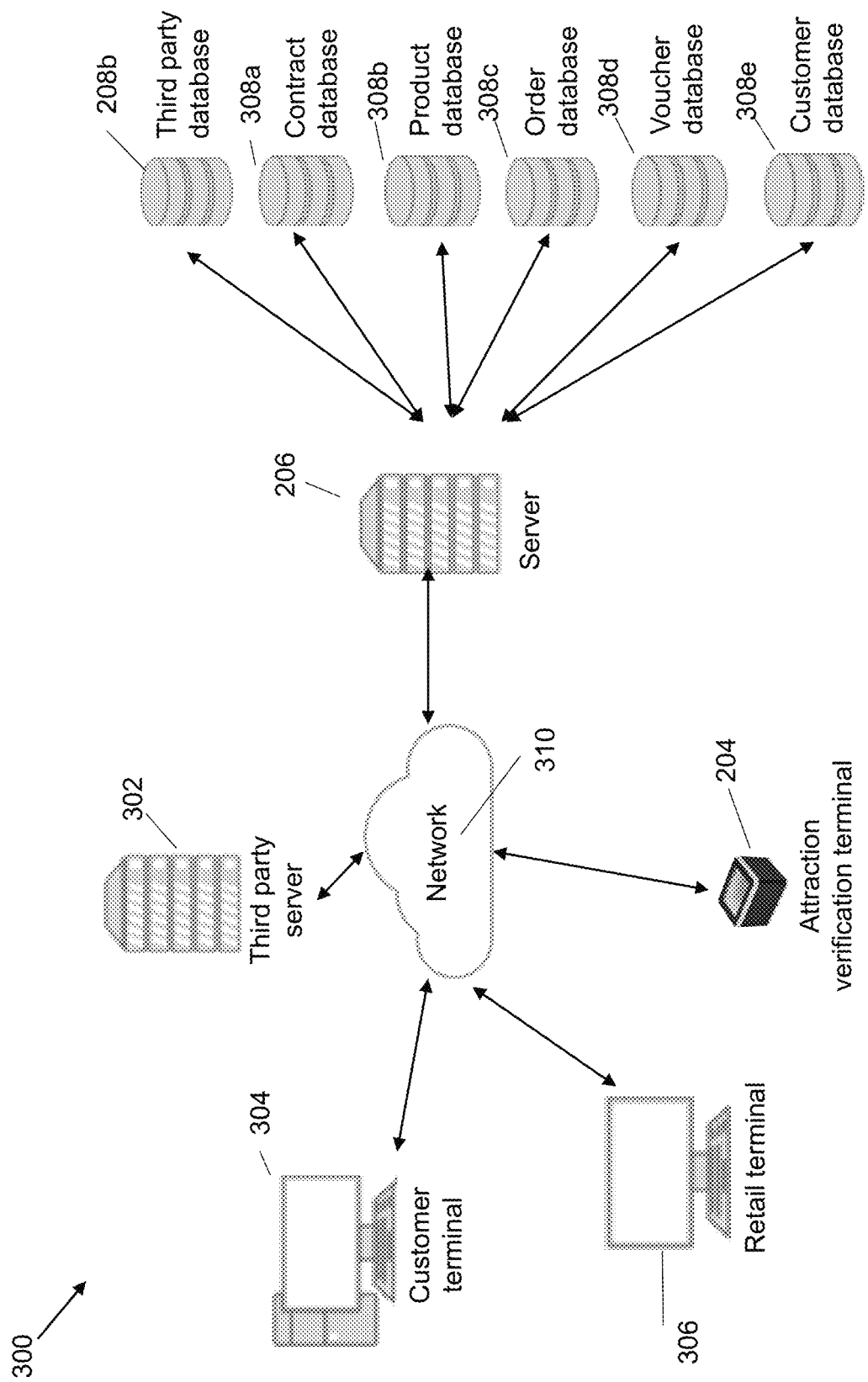
FIG. 3 depicts an exemplary system diagram of third-party relationship management for attraction access in accordance with an embodiment of the present invention.

Referring now to FIG. 3, an exemplary computing system 300 is shown for managing third-party relationships for attraction access in accordance with an embodiment of the present invention and to perform the techniques depicted herein with respect to FIGS. 1, 2, and 4-6. The depicted computing system environment is only one example of a suitable computing environment and is not intended to suggest any limitation as to the scope of use or functionality. This exemplary system includes, inter alia, a customer terminal 304, a retail terminal 306, an attraction verification terminal 204, a third-party server 302, and a server 206, which interface to each other via network 310.

The customer terminal 304 and retail terminal 306 receive and fulfill customer orders for vouchers or passes to tour attractions. It should be noted that the customer terminal and the retail terminal have a system memory suitable for local temporary or permanent storage of order data, customer data, product data, and voucher data, as needed (as described in further detail in connection with FIG. 4). In some aspects, network 310 is the Internet and the customer terminal and the retail terminal have an Internet connection that allows order data, customer data, product data, and voucher data to be uploaded and downloaded from the remote server 206.

The third-party server 302 is in communication with the customer terminal 304 or the retail terminal 306 over the network 310. The third-party server 302 is administered by a third-party offering vouchers or passes for sale to customers who wish to access various attractions. The third-party may include vendors, distributors, resellers, or attraction owners.

The attraction verification terminal 204 scans an access identifier that has been previously provided to the customer to generate an access request. For example, once the customer has completed his or her order at the customer terminal 304 or retail terminal 306, the customer receives an access identifier corresponding to the order. When the customer and related parties elect to tour an attraction, the customer scans the access identifier at an attraction verification terminal 204 that is near the attraction site. The attraction verification terminal constructs an access request corresponding to the access identifier, and transmits the access request over the network 310 to the server 206.

The server 206 communicates with the third-party database 208b, the contract database 308a, the product database 308b, the order database 308c, the voucher database 308d, and the customer database 308e to determine and validate access privilege data based on the access request. Upon a determination that the access privilege data is valid, the server constructs and transmits to the attraction verification terminal a virtual access token that allows the customer and related parties to access the attraction site.

The third party database 208b, the contract database 308a, the product database 308b, the order database 308c, the voucher database 308d, and the customer database 308e may be located in one or more databases or database tables resident on the server 206, an independent database or other memory accessible by the server 206, or a disk storage or other similar system suitable for storing and accessing electronic files. The third party database 208b is configured to store data relating to third-parties, such as vendors, resellers, and distributors. The contract database 308a is configured to store data relating to contractual agreements relating to attraction sites and third-parties. The product database 308b is configured to store data relating to attraction sites or other products for which a customer may purchase a voucher or ticket and request access. The order database 308c is configured to store data relating to customer orders for attraction sites and tours thereof. The voucher database 308d is configured to store data relating to vouchers and tickets granting access to the attraction sites and tours. The customer database 308e is configured to store data relating to customers who purchase vouchers and tickets for attraction access.

Additionally, the server determines and validates referral data based on the access request, so as to determine a reimbursement amount for a plurality of third-parties based on the referral data. The server generates a hierarchy of relationships among the third-parties, based on data corresponding to a series of one or more contracts among the third-parties. The attraction access system generates the hierarchy of relationships by parsing structured or unstructured data relating to the one or more contracts to determine the access identifier, customer data, order data, a third-party identifier, or any combination of the foregoing data.

The number of terminals 304, 306, servers 206, 302, and databases 208b, 308a, 308b, 308c, 308d, and 308e are merely exemplary and others may be omitted or added without departing from the scope of the present invention. Further, the databases 208b, 308a, 308b, 308c, 308d, and 308e may be combined into a single database and/or be included in server 206. It should also be appreciated that one or more databases, including the databases 208b, 308a, 308b, 308c, 308d, and 308e may be combined, provided in, or distributed across one or more of the servers 206, 302.

Figure 4:
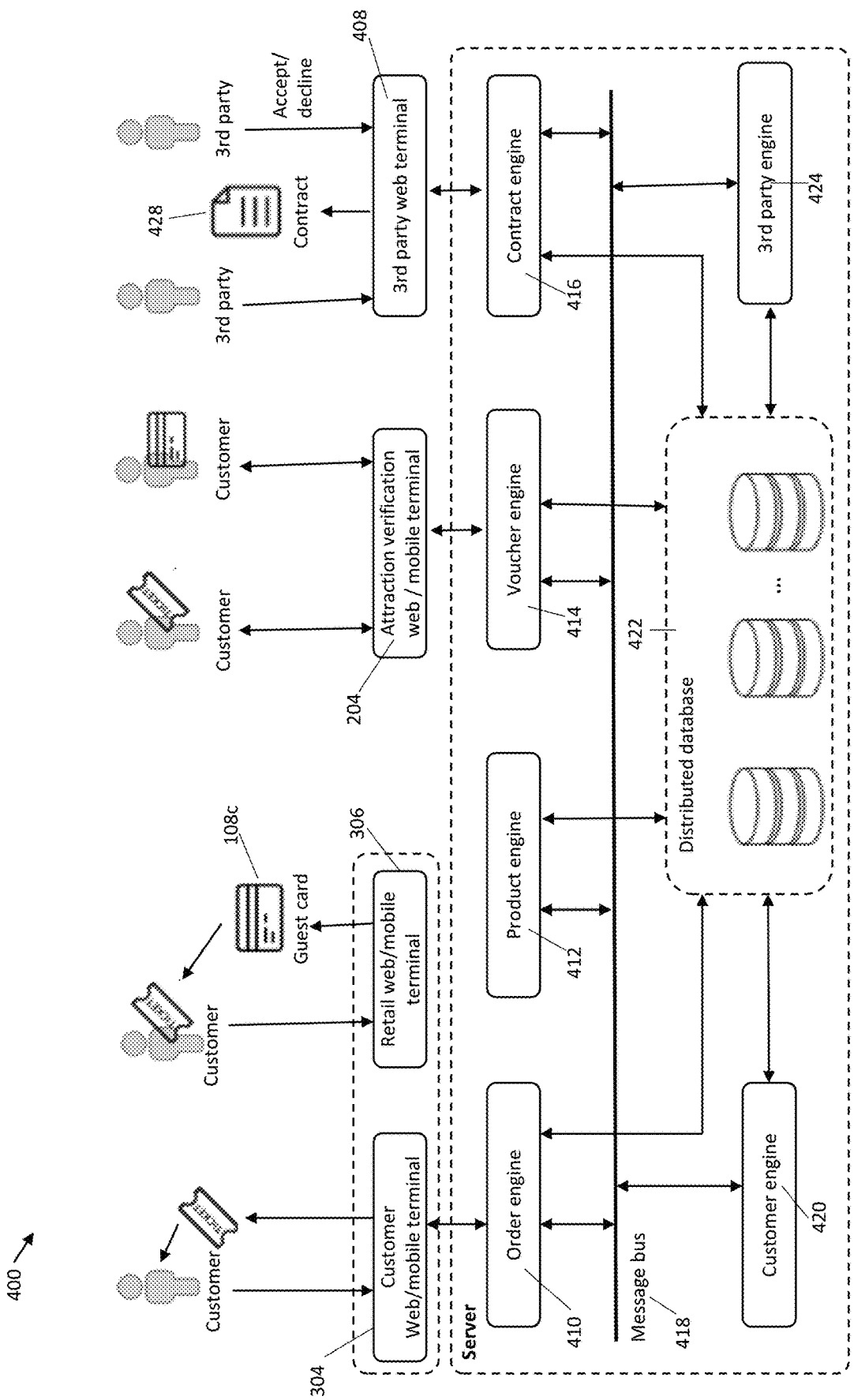
FIG. 4 depicts a diagram of an exemplary interaction between a customer and the attraction access system in accordance with an embodiment of the present invention.

Referring now to FIG. 4, a diagram of an exemplary interaction between a customer and the attraction access system 400 is shown in accordance with an embodiment of the present invention. The attraction access system 400 includes a customer engine 420, order engine 410, product engine 412, voucher engine 414, contract engine 416, and third-party engine 424 in communication over a message bus 418 with each other and with a database 422. The database 422 may be a distributed database.

A customer may place an order at a customer terminal 304 or a retail terminal 306. The customer and retail terminal may be available to the customer online, such as via a website displayed on the customer or retail terminal. Alternatively, the customer and retail terminal may be available on a mobile device owned by the customer or by the retailer, such as via a mobile app or a mobile-optimized website. The customer terminal or retail terminal receives the customer order and determines order data, customer data, product data, and voucher data based on the customer order, for example by parsing and processing the received information. If the retail terminal receives the customer order, the retail terminal may additionally determine third-party data and contract data based on the received information.

Order data may include information relating to the price, desired date and time, products or attractions to visit, and expiration date for the customer's order. The order engine 410 receives, parses, and stores order data in communication with the database 422, the customer engine 420, and the product engine 413.

Customer data includes information relating to the customer and related parties. Non-limiting example customer data may include identifying information, such as names, ages, age groups, addresses, phone numbers, or dates of birth of the customer and related parties who are interested in touring attractions. The customer engine 420 receives and stores customer data in communication with the database 422.

Product data includes information relating to each attraction having tours offered for sale. Example product data includes an attraction name, owner, administrator, address, phone number, website, and hours of operation. The product engine 412 receives and stores product data in communication with the database 422.

Voucher data includes information relating to available vouchers offered by the attraction access system 400 along with customer-specific voucher information. Example voucher data includes an access identifier, any caps or limits on the number of attractions that the customer may visit, any limits or expirations on dates or times that a voucher or pass is valid, or any corresponding currency balance associated with a voucher or pass for a specific customer. The voucher engine 414 receives and stores voucher data in communication with the database 422. Additional information regarding voucher data and voucher management applicable to the present attraction access system is described in U.S. patent application Ser. No. 16/455,060 entitled "ELECTRONIC VOUCHER MANAGEMENT FOR ATTRACTION ACCESS", the entire disclosure of which is hereby incorporated by reference herein for all purposes.

After processing the customer data, order data, product data, and voucher data, the customer terminal 302 may issue a physical or virtual ticket to the customer. An access identifier (not shown) may be associated with the ticket. Example access identifiers may include a quick-response (QR) barcode, a matrix barcode, a two-dimensional barcode, a one-dimensional barcode, or other manner of encoding the access identifier in a manner so that the attraction verification terminal 204 is operable to decode the access identifier upon presentation by the customer for redemption for a visit or tour of the attraction.

Alternatively, the retail terminal 306 may process the customer data, order data, product data, and voucher data as discussed above in connection with the customer terminal 302. After processing such data, the retail terminal 306 may transmit an order to the present attraction access system to issue a physical guest card 108c to the customer, or the customer may elect to refill a currency balance associated with a previously issued guest card. As discussed above, the attraction access system may associate an access identifier (not shown) with the guest card. The attraction access system may use contract data in connection with third-party data to track physical or virtual contractual agreements established for each attraction that the customer desires to access.

Third-party data includes information relating to third parties of the attraction access system 400. Example third parties include vendors, distributors, and resellers offering for sale vouchers or access to attractions. Example third-party data includes a name, address, phone number, website, and email address for the third-party as well as corresponding contract data.

Contract data relates to contractual agreements 428 into which a third-party may have entered. Non-limiting example contract data includes an effective date of the contractual agreement, a termination date, a list of parties to the contractual agreement, and a list of attractions associated with the contractual agreement. The list of parties may further include a reference or pointer to corresponding third-party data that provides further detail regarding a specific party, such as tracking an authorized representative of the third party. The list of attractions may further include a reference or pointer to corresponding product data that provides further detail regarding a specific attraction site or product. In some aspects, some contractual agreements may specify a format for the access identifier associated with the attraction. For example, an attraction verification terminal at the Empire State Building may only scan one-dimensional barcodes with a numeric identifier, and the contract data may further specify that the numeric identifier is required to include a specific prefix, either numerical or alphabetical. Although some third parties may have direct contractual agreements with attractions that allow the third parties to sell or resell access to an attraction, other third-parties may lack such contractual agreements with the attractions. Other third parties may have indirect contractual agreements with third parties to permit resale of attraction access. Accordingly, the contract data may be used to generate a series of virtual contracts or a hierarchy of virtual contracts for determining one or more reimbursement amounts for various third parties, in connection with attraction access. The contract engine 416 receives and stores third-party data and contract data in communication with the database 422.

In some aspects, the attraction access system may determine the contract data by parsing unstructured contractual agreements, for example via optical character recognition. In other aspects, the attraction access system may determine the contract data by parsing structured contractual agreements, such as when the contractual agreements exist in XML form in the attraction access system.

Figure 5:
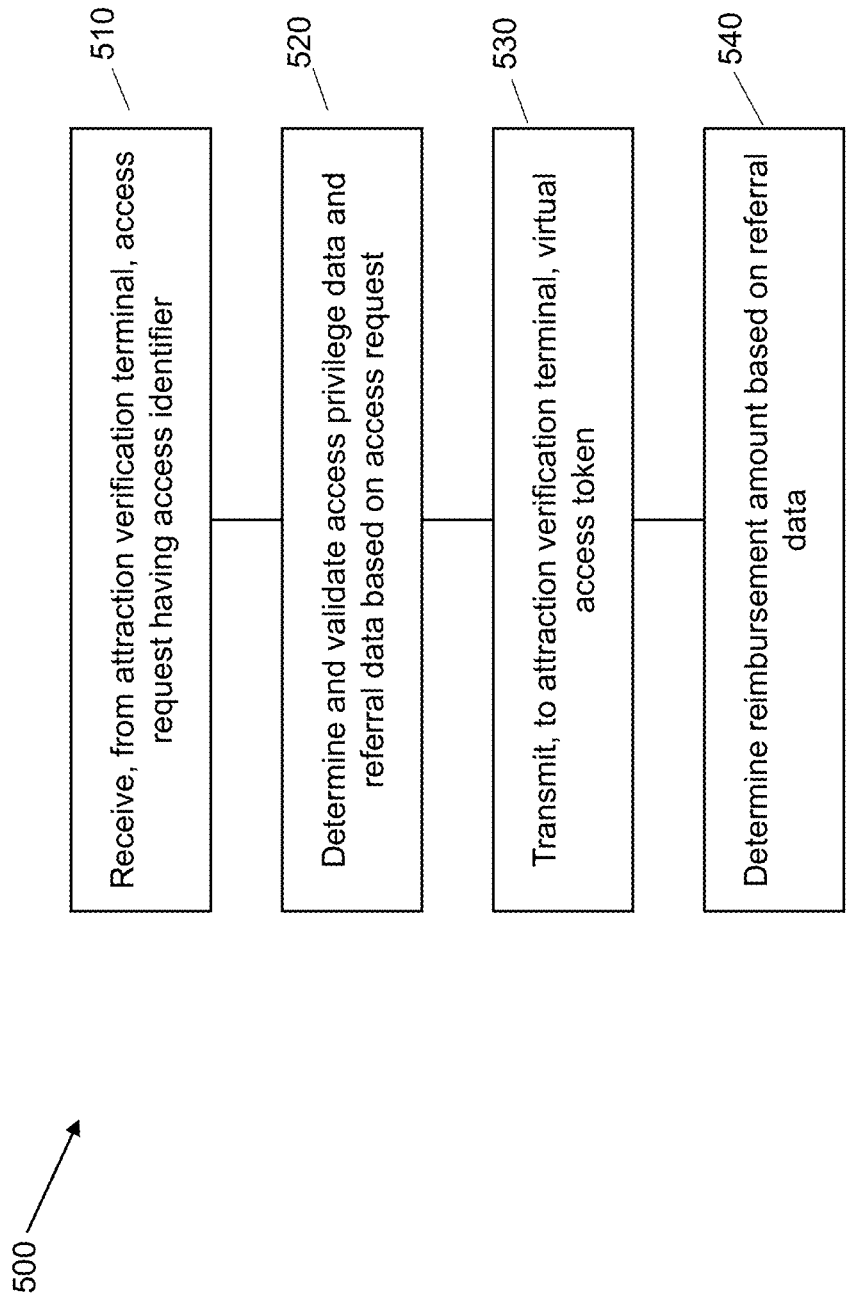
FIG. 5 is a flowchart depicting an exemplary method for third-party relationship management for attraction access in accordance with an embodiment of the present invention.

Referring now to FIG. 5, a flow chart is shown depicting an exemplary process 500 for managing third-party relationships for attraction access, in accordance with an embodiment of the present invention.

A server receives an access request from an attraction verification terminal at an attraction site (step 510). The access request has an access identifier. For example, the server may receive scan results from the attraction verification terminal to validate the access identifier for the customer. The server may receive such access request over a network via HyperText Transfer Protocol (HTTP). Non-limiting example access identifiers may include a universal access identifier, a virtual attraction pass, a credit card, a debit card, a quick response (QR) code, a two-dimensional barcode, or a one-dimensional barcode. Non-limiting example attraction sites may include a sightseeing experience, a bus tour, a boat tour, a helicopter tour, a walking tour, a bicycle tour, a building tour, a theatre show, a play, a musical, a museum, an observatory, a restaurant, a food experience, a shopping experience, an escape room, a library, or a historical building.

The server determines and validates access privilege data and referral data based on the access request (step 520). For example, the server may determine access privilege data by identifying one or more rules from a rules base based on an attraction identifier, access identifier, or customer identifier retrieved from the access request. The server may use additional information to determine the corresponding rule, such as a date and time that the customer is requesting access to the attraction.

The server validates access privilege data for the attraction site based on the identified rule. For example, the server may execute the identified rule and use the result of execution to validate the access privilege data.

The server determines referral data by generating a hierarchy of relationships among third-parties associated with the attraction. The attraction access system generates the hierarchy of relationships based on the access identifier, customer data, order data, a third-party identifier, or any combination of the foregoing data. The attraction access system may determine the order data and third-party identifier by parsing structured or unstructured data relating to one or more contracts associated with the attraction or with the third-parties.

The server validates referral data by processing the hierarchy of relationships. For example, the server may process contract data and third-party data associated with the one or more contracts to validate the contractual relationship between the third parties. Validating the contractual relationship may include confirming that each contract in the hierarchy is unexpired.

The server transmits a virtual access token to the attraction verification terminal (step 530). Upon determining and validating the access privilege data, the server constructs a virtual access token. The virtual access token allows access to the attraction site by triggering the attraction verification terminal to operate a physical device located at the attraction site. For example, the attraction verification terminal may unlock a turnstile, bar, or other ingress so that the customer is allowed to enter the desired attraction. Alternatively, the attraction verification terminal may display an indicator on a screen that demonstrates to an attraction operator that the attraction operator should allow the customer to enter the attraction.

The server determines a reimbursement amount for one or more third-parties, based on the referral data (step 540). Non-limiting example reimbursement amounts may include a commission amount or a contracted rate to the third-parties. The reimbursement amount can vary upon access by the customer to a subsequent attraction site. For example, in some aspects determining the reimbursement amount can include determining commission for the vendor upon a determination that the vendor sold access to a first attraction site, without selling access to a subsequent attraction site for which the customer purchased a subsequent voucher.

For example, upon access by the customer to a subsequent attraction site following access to a first attraction site, the server may determine commission for a vendor based on the universal access identifier. The server may determine that the customer has requested access to a subsequent attraction site by retrieving customer data for the customer based on the universal access identifier. The customer data may include a history of attraction access for the customer, thereby allowing the attraction access system to recognize that the customer has accessed the subsequent attraction site. The attraction access system may determine a reimbursement amount for the vendor associated with the first attraction site based on the universal access identifier, even if such vendor did not sell access to the subsequent attraction site, and even if such vendor lacks any contractual agreement with the subsequent attraction site.

Further, the server may determine a reimbursement amount based on a series of virtual contracts among the vendors. For example, the referral data may indicate that a first third-party entered into a contractual agreement with a second third-party to resell access to the attraction site. The second third-party may have a direct contractual agreement with the attraction site, and the first third-party may be a reseller, such as a travel website, having a contractual agreement with the second third party to resell access to the attraction site. The server may construct a hierarchy of relationships based on contract data corresponding to the series of one or more virtual contracts, and calculate the updated reimbursement amount based on the referral data. For example, the server may determine that the first third-party is owed a reimbursement amount based on a first contracted rate and a second contracted rate. The first contracted rate may be reflected in the contract data for the contract between the second third-party and the attraction site. The second contracted rate may be reflected in the contract data for the contract between the first third-party and the second third-party.

Figure 6:
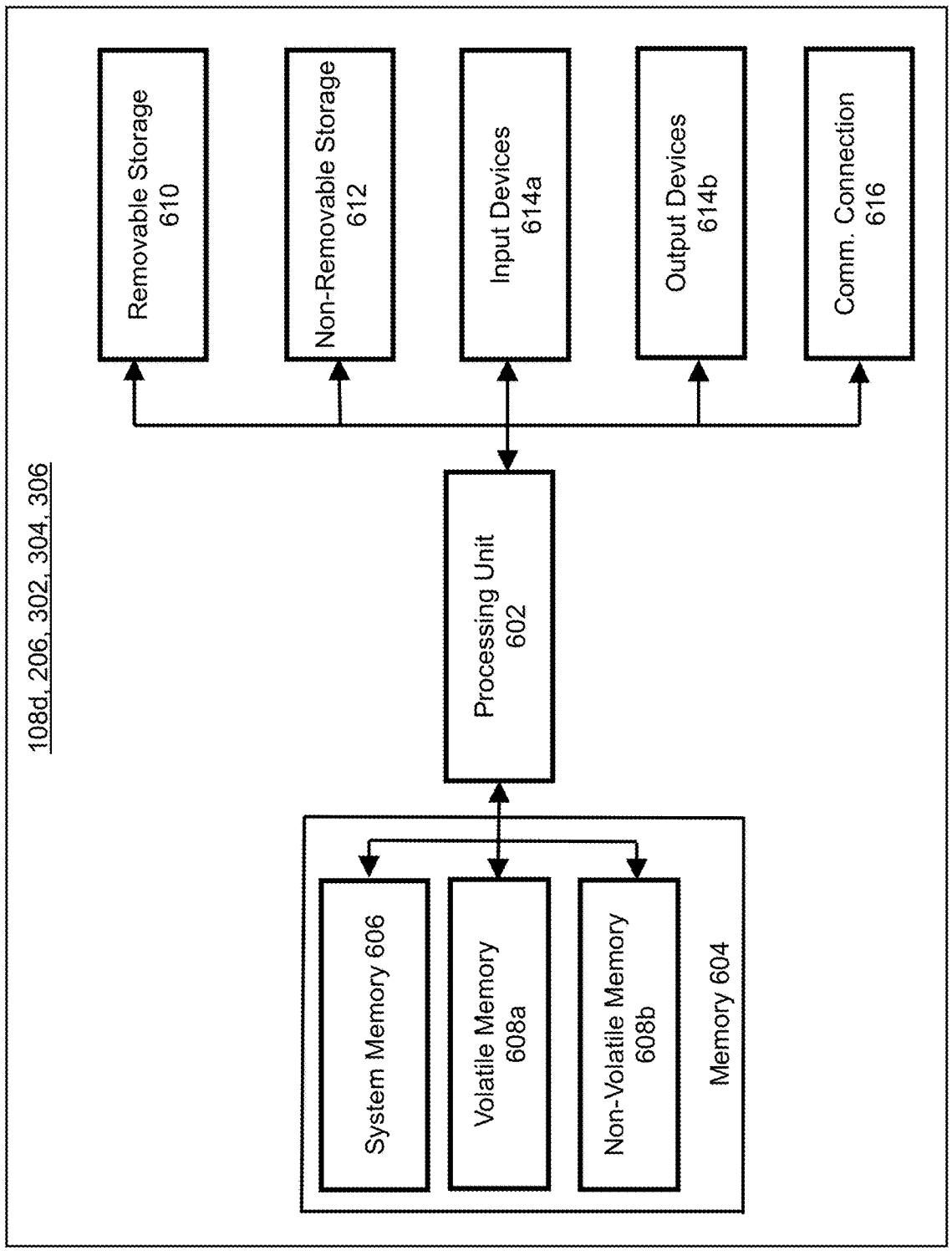
FIG. 6 depicts a block diagram of an exemplary computing device with which various embodiments of the present invention may be implemented.

FIG. 6 depicts a schematic view of an exemplary computing device 108d, 206, 302, 304, 306 on which various embodiments of the present invention may be implemented as described herein. For example, a user of a computing device such as the computing device 108d, 206, 302, 304, 306 may utilize the device to manage third-party relationships in connection with attraction access and to perform the processes described herein with respect to FIG. 5. The depicted computing system environments depicted in FIGS. 3 and 4 are exemplary of two suitable computing environments and are not intended to suggest any limitation as to the scope of use or functionality. Numerous other general-purpose or special-purpose computing system environments, computing devices, and configurations may be used or substituted. Examples of well-known computing systems, devices, environments, and/or configurations that may be suitable for use include, but are not limited to, personal computers ("PCs"), server computers, handheld or laptop devices, multiprocessor systems, microprocessor-based systems, network PCs, minicomputers, mainframe computers, e-readers, cell phones, tablets, embedded systems, distributed computing environments that include any of the above systems or devices, and the like.

Computer-executable instructions such as programs or program modules executed by a computing device or processing unit may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

The computing device 108d, 206, 302, 304, 306, in its most basic configuration as depicted in FIG. 6, includes at least one processing unit 602 and at least one memory 608a, 608b. Depending on the exact configuration and type of the computing device, the memory may be volatile (such as random access memory ("RAM")), non-volatile (such as read-only memory ("ROM"), flash memory, etc.), or a combination of the two. In addition to that described herein, the computing device may be any network-accessible device (e.g., cell phone, smartphone, tablet, personal computer, server computer, or the like) including those operating via Android, Apple, Linux, Unix, and/or Windows mobile or non-mobile operating systems.

The computing device 108d, 206, 302, 304, 306 may have additional features and functionality. For example, the computing device may include additional storage (such as removable and/or non-removable storage) including, but not limited to, magnetic or optical disks or tape, thumb drives, and external hard drives as applicable. Such additional storage is illustrated in FIG. 6 by removable storage 610 and non-removable storage 612.

The computing device 108d, 206, 302, 304, 306 typically includes or is provided with a variety of computer-readable media. Computer-readable media can be any available media that can be accessed by the computing device and includes both volatile and non-volatile media, removable and non-removable media. By way of example, and not limitation, computer-readable media may comprise computer storage media and computer memory which contains on a transitory basis communication media that are streamed to the computing device via the communication connections 616.

Computer storage media includes volatile and non-volatile, removable and non-removable media implemented in any method or technology for storage of information such as computer-readable instructions, data structures, program modules or other data. Memory 304, removable storage 308, and non-removable storage 310 are all examples of computer storage media. Computer storage media includes, but is not limited to, RAM, ROM, electrically erasable programmable read-only memory ("EEPROM"), flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can accessed by the computing device 108d, 206, 302, 304, 306. Any such computer storage media may be part of computing device as applicable.

The computing device 108d, 206, 302, 304, 306 may also contain a communications connection 616 that allows the device to communicate with other devices. Communication media typically embodies computer-readable instructions, data structures, program modules and/or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, radio frequency ("RF"), infrared and other wireless media. The term computer-readable media as used herein includes both storage media and communication media.

The computing device 108*d*, 206, 302, 304, 306 may also have input device(s) 614*a* such as a keyboard, mouse, pen, voice input device, touch input device, etc. Output device(s) 614*b* such as a display, speakers, printer, etc. may also be included. All these devices are generally known to those of ordinary skill in the art and therefore need not be discussed in any detail herein except as provided.

Notably, referring back to FIG. 3, the computing device 108*d*, 206, 302, 304, 306 may be interconnected with a network 310. As may be appreciated, the network may be any appropriate network and the computing device may be connected thereto by way of an interface such as communication connections 616 in any appropriate manner, and the computing device may communicate with one or more of the other computing devices via the network in any appropriate manner. For example, the network may be a wired network, wireless network, or a combination thereof within an organization, a home, or the like, and may include a direct or indirect coupling to an external network such as the Internet or the like. Likewise, the network may be such an external network including, without limitation, the Internet.

In FIGS. 2-4 the depicted embodiments of the attraction access system use a standard client-server technology architecture, which allows users of the attraction access system to access information stored in a database such as the database 208*a*, 208*b*, 308*a*, 308*b*, 308*c*, 308*d*, 308*e* via a user interface. The application or program may be in communication with a server such as the servers 206, 302 that is accessible via a network such as the Internet using a publicly addressable Uniform Resource Locator ("URL") in order to receive content to display. For example, users can access content from the attraction access system using any web-enabled device equipped with a web browser, such as the mobile device 108*d*, the customer terminal 304, or the retail terminal 306. Communication between software components and subsystems are achieved by a combination of direct function calls, publish-and-subscribe mechanisms, stored procedures, and direct SQL queries, however, alternate components, methods, and/or subsystems may be substituted without departing from the scope hereof.

As shown in FIG. 6, the computing device 108*d*, 206, 302, 304, 306 has a system memory that is locally attached and/or integrated into computing device 302. The local content store contains files suitable for processing by the system described herein. Such files may be obtained for storage on the memory 304, removable storage 308, and/or non-removable storage 310 through various techniques including, but not limited to, having been: downloaded via a network connection (e.g., from a network via communication connection 312); stored in a local buffer as a part of a media stream; pre-loaded on memory 304, removable storage 308, and/or non-removable storage 310; generated locally at the computing device; transferred from a removable storage device 308 (e.g., a flash drive) to memory 304; or similar methods of obtaining electronic files for storage on a storage device.

It should be understood that the various techniques described herein may be implemented in connection with hardware or software or, as appropriate, with a combination of both. Thus, the methods and apparatus of the presently disclosed subject matter, or certain aspects or portions thereof, may take the form of program code (i.e., instructions, scripts, and the like) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter (e.g., through the use of an application-program interface ("API"), reusable controls, or the like). Such programs may be implemented in as code in a high-level procedural or object-oriented programming language to communicate with a computer system. However, the program(s) can be implemented in assembly language or machine language, if desired. In any case, the code may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as the attraction access system 300, 400 or a distributed computing environment. Still further, aspects of the presently disclosed subject matter may be implemented in or across a plurality of processing chips or devices, and storage may similarly be effected across a plurality of devices in or connected with the attraction access system. Such devices might include personal computers, network servers, and handheld devices (such as, cell phones, tablets, smartphones, etc.), for example.

In the exemplary embodiments, the computing device 108*d*, 206, 302, 304, 306 is programmed to execute a plurality of processes including those referenced with respect to FIG. 5 as discussed in detail above.

Operation of the present attraction access system is described herein by way of an exemplary attraction access. In operation, a customer desires to purchase a first tour of the Empire State Building and a second tour of the Botanical Gardens. The customer purchases a first voucher or pass from an online reseller, such as Trip Counselor, for the Empire State Building tour. City Sightseeing is a distributor that has previously executed a first contractual agreement with the Empire State Building tour operator. The first contractual agreement includes a reimbursement rate of 15%, meaning that City Sightseeing receives a 15% commission based on the purchase price of the first voucher purchased by the customer. City Sightseeing has also previously executed a second contractual agreement with Trip Counselor, for Trip Counselor to resell vouchers for tours of the Empire State Building. In some aspects, resellers such as Trip Counselor may find such reseller contractual agreements useful, as the Empire State Building may elect to restrict the number of distributors such as City Sightseeing that the Empire State Building has contractual agreements with, or the number of distributors eligible for favorable reimbursement rates such as 15%. The second contractual agreement between City Sightseeing and Trip Counselor includes a reimbursement rate of 12%, meaning that Trip Counselor receives a 12% commission based on the purchase price of the first voucher purchased by the customer.

In some aspects, if multiple contractual agreements are associated with a particular attraction site such as the Empire State Building, the present attraction access system determines the amount that the customer is charged for the first order based on one or more selection rules. The selection rules may determine a series of one or more contracts associated with the Empire State Building, and identify an appropriate rate that the customer should pay based on the contracts. For example, the selection rules may identify a rate based on the contracts that will result in the lowest price that will be charged to the customer. The selection rules may also identify the rate based on additional contract data tracked in the selection rules. For example, the contract data may dictate that during seasonal timeframe, such as Christmas or other holidays, the rate charged to the customer would be displayed subject to a 20% or 25% increase.

Upon receiving the first order from the customer for the Empire State Building tour, the present attraction access system determines that the customer is a new customer. The present attraction access system generates a new universal access identifier for the customer and transmits the universal access identifier to Trip Counselor. Upon receipt of the universal access identifier, Trip Counselor may send to the customer a first order confirmation containing the universal access identifier, for example displayed in an email, on a webpage, or in a mobile app. Alternatively, Trip Counselor may allow the customer to purchase a guest card such as a debit or credit card for use at multiple attraction sites. The present attraction access system may associate the debit or credit card with the universal access identifier, and with a voucher or pass allowing access to the Empire State Building tour. For example, the present attraction access system may associate the guest card with the customer data and issue the guest card to the customer.

The customer may also decide to purchase a second voucher or pass from Trip Counselor, for example for a tour at a Botanical Garden. Trip Counselor receives a customer order for a second voucher or pass for the botanical garden tour from Garden Tours, a tour operator. Garden Tours is a tour operator that has previously executed a third contractual agreement with the Botanical Garden tour company. The third contractual agreement includes a reimbursement rate of 20%, meaning that Garden Tours receives a 20% commission based on the purchase price of the second voucher purchased by the customer. Garden Tours has also executed a fourth contractual agreement with Trip Counselor, for Trip Counselor to resell vouchers for tours of the Botanica Gardens. The fourth contractual agreement between Garden Tours and Trip Counselor includes a reimbursement rate of 10%, meaning that Trip Counselor receives a 10% commission based on the purchase price of the second voucher purchased by the customer.

Upon receiving the second order from the customer for the Garden State tour, the present attraction access system determines that the customer is an existing customer, retrieves the universal access identifier corresponding to the customer, and transmits the universal access identifier to Trip Counselor. After generation of the universal access identifier, Trip Counselor may send to the customer a second order confirmation containing the universal access identifier, for example displayed in an email, on a webpage, or in a mobile app. Alternatively, the present attraction access system may receive order data from Trip Counselor for the customer to add the second voucher onto a previously purchased guest card such as a debit or credit card for use at multiple attraction sites. The present attraction access system may associate the debit or credit card with the universal access identifier, and with a voucher or pass allowing access to the Botanical Garden tour.

The present example includes four contractual agreements: a first contractual agreement between City Sightseeing and Empire State Building, a second contractual agreement between City Sightseeing and Trip Counselor, a third contractual agreement between Garden Tours and Botanical Garden, and a fourth contractual agreement between Garden Tours and Trip Counselor. Third-party data includes data relating to City Sightseeing, Garden Tours, and Trip Counselor, such as each company's name, address, main phone number, and website. Product data includes data relating to the Empire State Building tour and the Botanical Garden tour, such as an attraction name, owner, address, phone number, website, and hours of operation of the attraction. Voucher data includes information relating to the first and second voucher issued to the customer, such as access identifiers, expiration dates and times, and access entry guidelines (e.g., the customer is allowed to entry to the attraction site twice). Contract data includes the parties, a company representative for each third party, an effective date, a termination date, and associated attractions. The present attraction access system receives the contract data corresponding to the contractual agreements and creates series of contracts. For example, the present attraction access system processes the contract data to associate a series of virtual contracts with each attraction. Virtual contracts for the first contractual agreement between City Sightseeing and Empire State Building and the second contractual agreement between City Sightseeing and Trip Counselor are associated with the Empire State Building. Virtual contracts for the third contractual agreement between Garden Tours and Botanical Garden and the fourth contractual agreement between Garden Tours and Trip Counselor are associated with the Botanical Garden.

The first and second voucher that the customer receives from Trip Counselor each have an access identifier that allows access to an attraction site such as the Empire State Building or the Botanical Garden. The access identifier may be a visual identifier such as a QR code, or the access identifier may be associated with a guest card such as a debit or credit card carried by the customer, as described above. The access identifier may also be a universal access identifier that allows identification of the customer as he travels to the first and second attraction site. The customer arrives at the Empire State Building attraction site and presents the first voucher for processing by the first attraction verification terminal. For example, the customer displays on his mobile device an email, web page loaded in a mobile browser, or a mobile app from Trip Counselor that displays the access identifier. The first attraction verification terminal processes the first access identifier presented by the customer, constructs an access request, and transmits the access request to the attraction access system.

Alternatively, the customer presents the first voucher by swiping a guest card at a Point Of Sale terminal that acts as the first attraction verification terminal. Once the customer presents the guest card at the Point Of Sale terminal (e.g., by swiping the debit or credit card), the attraction access system receives the access request including the access identifier. For example, the swipe transaction received from the Point-of-Sale terminal may include a third-party merchant identifier that permits the attraction access system to determine and validate access privilege data based on the third-party merchant identifier along with the customer data, order data, product data, and voucher data associated with the guest card from the corresponding databases.

The present attraction access system receives the access request and determines access privilege data based on the access request. For example, the attraction access system may identify one or more rules from a rules base based on an attraction identifier, access identifier, or customer identifier retrieved from the access request. Further, the server may use additional information to determine the corresponding rule, such as a date and time that the customer is requesting access to the attraction. The attraction access system validates the access privilege data, for example by executing one or more identified rules. If the access privilege data is valid, the attraction access system constructs a virtual access token. The server sends the virtual access token to the attraction verification terminal. Upon receipt of the virtual access token, the attraction verification terminal allows the customer to access the desired attraction, for example by displaying a success indicator to a tour operator or unlocking an associated turnstile.

The present attraction access system additionally determines referral data for the attraction access. For example, the attraction access system generates a hierarchy of relationships among third parties associated with the attraction. The attraction access system generates the hierarchy of relationships based on the access identifier, customer data, order data, a third-party identifier, or any combination of the foregoing data. For example, for the first voucher the attraction access system generates a hierarchy of relationships among the Empire State Building, City Sightseeing, Garden Tours, and Trip Counselor based on the series of virtual contracts. The hierarchy of relationships includes Garden Tours due to the contractual agreements between City Sightseeing and Trip Counselor, and between Garden Tours and Trip Counselor. Thus, the attraction access system infers an indirect relationship between City Sightseeing and Garden Tours. The attraction access system may determine the order data and third-party identifier by parsing structured or unstructured data relating to one or more contractual agreements associated with the attraction or with the third-parties. The attraction access system subsequently validates the referral data by processing the hierarchy of relationships. For example, the attraction access system iterates through the virtual contract associated with each relationship to confirm that the contract is unexpired.

The attraction access system determines a reimbursement amount based on the referral data. For example, the first virtual contract stipulates a reimbursement rate of 15% and the second virtual contract stipulates a reimbursement rate of 12%. If the payment received from the customer by Trip Counselor was $20 for an Empire State Building tour, the attraction access system determines a reimbursement rate of $3 ($20×15%) to City Sightseeing and $2.40 ($20×12%) to Trip Counselor. Contemporaneously with allowing attraction access to the customer, the attraction access system can pay the determined reimbursement amount to Trip Counselor and City Sightseeing.

Similarly, the customer arrives at the Botanical Garden attraction site and presents the second voucher for processing by the second attraction verification terminal. The determination and validation of the access privilege data and construction of the virtual access token for the second voucher proceeds similar to the processing for the first voucher, as described above.

The present attraction access system determines and validates referral data based on the access request for the second voucher. The attraction access system generates a hierarchy of relationships among third parties that are directly and indirectly associated with the attraction. The attraction access system generates the hierarchy of relationships based on the access identifier, customer data, order data, a third-party identifier, or any combination of the foregoing data. For example, for the second voucher the attraction access system generates a hierarchy of relationships among the Botanical Garden, Garden Tours, City Sightseeing, and Trip Counselor based on the series of virtual contracts. The attraction access system may determine the order data and third-party identifier by parsing structured or unstructured data relating to one or more contractual agreements associated with the attraction or with the third-parties. The hierarchy of relationships includes Trip Counselor, Garden Tours, and City Sightseeing. The hierarchy of relationships includes City Sightseeing due to the indirect relationship between Garden Tours and City Sightseeing resulting from the second contractual agreement between City Sightseeing and Trip Counselor and the fourth contractual agreement between Garden Tours and Trip Counselor, as described above.

The attraction access system determines a reimbursement amount based on the referral data. For example, the third virtual contract stipulates a reimbursement rate of 20% and the fourth virtual contract stipulates a reimbursement rate of 10%. If the payment received from the customer by Trip Counselor was $30 for an Empire State Building tour, the attraction access system determines a reimbursement rate of $6 ($30×20%) to Garden Tour and $3 ($30×10%) to Trip Counselor.

Additionally, the attraction access system may determine commission for the vendor upon a determination that the vendor sold the customer access to the attraction site without selling access to the subsequent attraction site. For example, the attraction access system determines a reimbursement amount to City Sightseeing based on the referral data, even though City Sightseeing was not involved with the customer's purchase of the second voucher from Trip Counselor. In some aspects, the attraction access system may identify rules from the rules base corresponding to the hierarchy of relationships created based on the series of contracts. The attraction access system processes the hierarchy of relationships to determine that City Sightseeing should receive a reimbursement amount as well. For example, the identified rules may stipulate that City Sightseeing should receive an indirect commission of 5% of the direct commission received by Trip Counselor (i.e., $0.15 ($3×5%)), even though City Sightseeing was uninvolved in the purchase of the second voucher by the customer. Contemporaneously with allowing attraction access to the customer, the attraction access system can pay the determined reimbursement amounts to Trip Counselor, Garden Tours, and City Sightseeing.

The various exemplary embodiments of the attraction access system discussed herein provide numerous advantages over conventional attraction access systems. For example, the present attraction access system determines reimbursement rates contemporaneously with allowing attraction access. The attraction access system thus increases the speed and accuracy of reimbursement transactions for third parties that provide attraction access. The attraction access system also reduces latency of reimbursement transactions and access transactions by contemporaneously determining reimbursement amounts for third parties while also allowing attraction access for customers.

Another advantage of the attraction access system is expanding availability of contracted rates to third parties who may not have contractual agreements or favorable reimbursement rates negotiated directly with attraction sites. The attraction access system increases reseller access to resell attraction tours, thereby increasing customer access to the same attraction tours who are able to purchase vouchers from an increased universe of third parties.

A further advantage of the attraction access system is providing a universal access identifier associated with a customer. The universal access identifier allows the customer access to more than one attraction and improves the reliability and accuracy of access transactions, for example by improving customer tracking.

A yet further advantage of the attraction access system is providing a guest card such as a debit or credit card as an access identifier. The guest card improves security and reliability of access transactions by enabling the customer to access an attraction without having to present a separate visual identifier such as a QR code or one-dimensional barcode.

It will be appreciated by those skilled in the art that changes could be made to the aspects described above without departing from the broad inventive concept thereof. It is to be understood, therefore, that the subject disclosure is not limited to the particular aspects and exemplary embodiments disclosed, but it is intended to cover modifications within the spirit and scope of the subject disclosure as defined by the claims.

We claim:

1. An apparatus for determining site-related reimbursement amounts for vendors, comprising:
  a processor in communication with an attraction verification terminal for an attraction site, the processor configured to:
    receive, from the attraction verification terminal, an access request for a customer having an access identifier, the access identifier being a universal access identifier configured to be acceptable at a plurality of attraction sites;
    determine and validate access privilege data for the customer and referral data for a plurality of vendors based on the access request and access identifier, wherein the processor configured to determine and validate referral data includes the processor being configured to identify a contractual relationship between the vendors based on a series of virtual contracts among the vendors;
    transmit, to the attraction verification terminal, a virtual access token permitting the customer to access the attraction site upon a determination that the access privilege data is valid; and
    upon receiving a subsequent access request for the customer to a subsequent attraction site based on the universal access identifier, determine a reimbursement amount for the plurality of vendors based on the contractual relationship identified between the vendors and on the access identifier.

2. The apparatus of claim 1, wherein the referral data for the plurality of vendors is associated with the universal access identifier, and wherein the processor configured to determine the reimbursement amount includes the processor configured to determine commission for a vendor among the plurality of vendors upon access by the customer to the subsequent attraction site based on the universal access identifier.

3. The apparatus of claim 2, wherein the processor configured to determine the reimbursement amount includes the processor being configured to determine commission for the vendor upon a determination that the vendor sold the customer access to the attraction site without selling access to the subsequent attraction site.

4. The apparatus of claim 1, wherein the processor configured to determine and validate the referral data comprises the processor being configured to validate the contractual relationship between the vendors based on parsing the series of virtual contracts among the vendors.

5. The apparatus of claim 4, wherein the processor configured to determine the reimbursement amount includes the processor being configured to determine commission for a vendor among the plurality of vendors based on the series of virtual contracts.

6. The apparatus of claim 4, wherein the processor configured to determine the reimbursement amount includes the processor being configured to determine a contracted reimbursement rate for a vendor among the plurality of vendors based on the series of virtual contracts.

7. The apparatus of claim 1, wherein the access identifier includes a universal access identifier, a virtual attraction pass, a credit card, a debit card, a quick response (QR) code, a two-dimensional barcode, or a one-dimensional barcode, wherein the vendor is a distributor or a reseller, or wherein the attraction site comprises a sightseeing experience, a bus tour, a boat tour, a helicopter tour, a walking tour, a bicycle tour, a building tour, a theatre show, a play, a musical, a museum, an observatory, a restaurant, a food or drink experience, a shopping experience, an escape room, a library, or a historical building.

8. The apparatus of claim 1, wherein the processor configured to receive the access request for the customer comprises the processor being configured to receive, from the attraction verification terminal, scan results to validate the access identifier for the customer.

9. The apparatus of claim 1, wherein the processor is further configured to pay the determined commission amount to the vendor.

10. A method for determining site-related reimbursement amounts for vendors, comprising:
  receiving, from an attraction verification terminal for an attraction site, an access request for a customer having an access identifier, the access identifier being a universal access identifier configured to be acceptable at a plurality of attraction sites;
  determining and validating access privilege data for the customer and referral data for a plurality of vendors based on the access request and access identifier, wherein the determining and validating referral data includes identifying a contractual relationship between the vendors based on a series of virtual contracts among the vendors;
  transmitting, to the attraction verification terminal, a virtual access token permitting the customer to access the attraction site upon a determination that the access privilege data is valid; and
  upon receiving a subsequent access request for the customer to a subsequent attraction site based on the universal access identifier, determining a reimbursement amount for the plurality of vendors based on the contractual relationship identified between the vendors and on the access identifier.

11. The method of claim 10, wherein the referral data for the plurality of vendors is associated with the universal access identifier, and wherein the determining the reimbursement amount includes determining commission for a vendor among the plurality of vendors upon access by the customer to the subsequent attraction site based on the universal access identifier.

12. The method of claim 11, wherein the step of determining the reimbursement amount includes determining commission for the vendor upon a determination that the vendor sold the customer access to the attraction site without selling access to the subsequent attraction site.

13. The method of claim 10, wherein the determining and validating the referral data comprises validating the contractual relationship between the vendors based on parsing the series of virtual contracts among the vendors.

14. The method of claim 13, wherein the step of determining the reimbursement amount includes determining commission for a vendor among the plurality of vendors based on the series of virtual contracts.

15. The method of claim 13, wherein the step of determining the reimbursement amount includes determining a contracted reimbursement rate for a vendor among the plurality of vendors based on the series of virtual contracts.

16. The method of claim 10, wherein the step of receiving the access request for the customer comprises receiving, from the attraction verification terminal, scan results to validate the access identifier for the customer.

17. The method of claim 10, further comprising paying the determined commission amount to the vendor.

18. A non-transitory computer-readable medium for determining site-related reimbursement amounts for vendors, comprising instructions stored thereon, which when executed on a processor, perform the steps of:

receiving, from an attraction verification terminal for an attraction site, an access request for a customer having an access identifier, the access identifier being a universal access identifier configured to be acceptable at a plurality of attraction sites;

determining and validating access privilege data for the customer and referral data for a plurality of vendors based on the access request and access identifier, wherein the determining and validating referral data includes identifying a contractual relationship between the vendors based on a series of virtual contracts among the vendors;

transmitting, to the attraction verification terminal, a virtual access token permitting the customer to access the attraction site upon a determination that the access privilege data is valid; and upon receiving a subsequent access request for the customer to a subsequent attraction site based on the universal access identifier, determining a reimbursement amount for the plurality of vendors based on the contractual relationship identified between the vendors and on the access identifier.

19. The non-transitory computer-readable medium of claim 18, wherein the access identifier is a universal access identifier associated with the customer, the referral data for the plurality of vendors is associated with the universal access identifier, and the step of determining the reimbursement amount includes determining commission for a vendor among the plurality of vendors upon access by the customer to a subsequent attraction site based on the universal access identifier.

20. The non-transitory computer-readable medium of claim 19, wherein the step of determining the reimbursement amount includes determining commission for the vendor upon a determination that the vendor sold the customer access to the attraction site without selling access to the subsequent attraction site.

* * * * *